Jan. 15, 1935.  E. A. FORD  1,988,309
FUEL INJECTION DEVICE FOR ENGINES
Filed Jan. 8, 1930   2 Sheets-Sheet 2
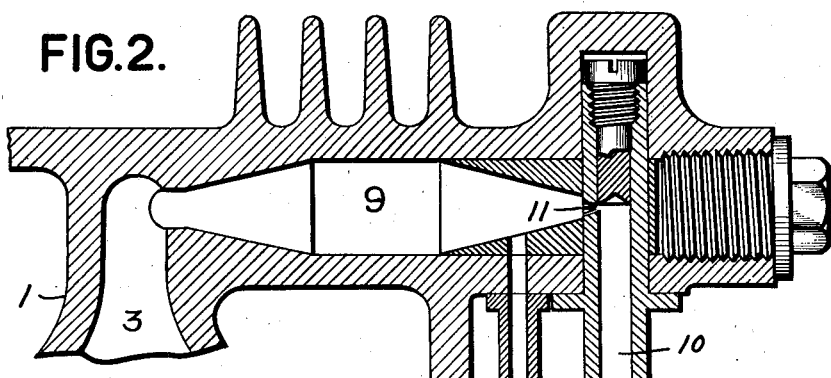
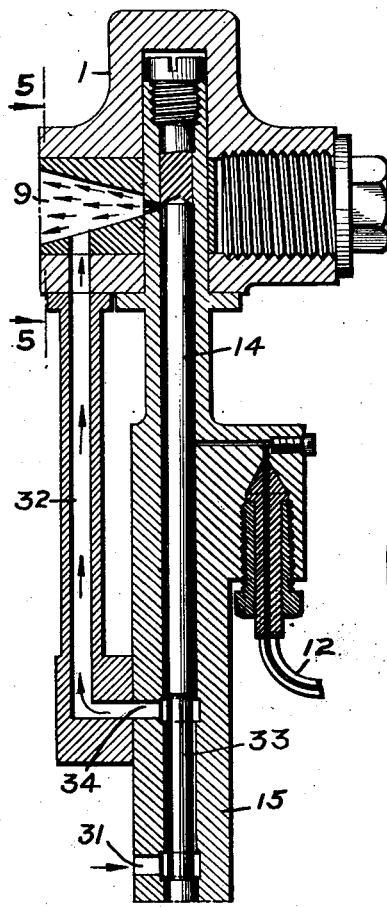
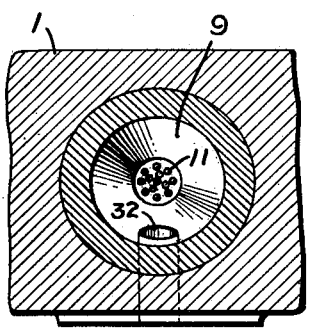
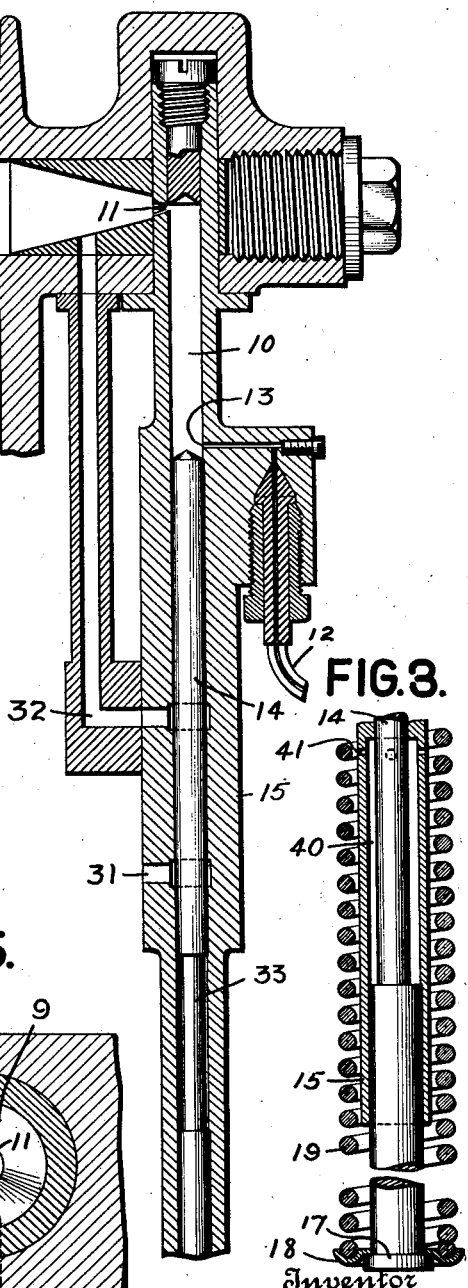
Inventor
EUGENE A. FORD
By his Attorney Patented Jan. 15, 1935

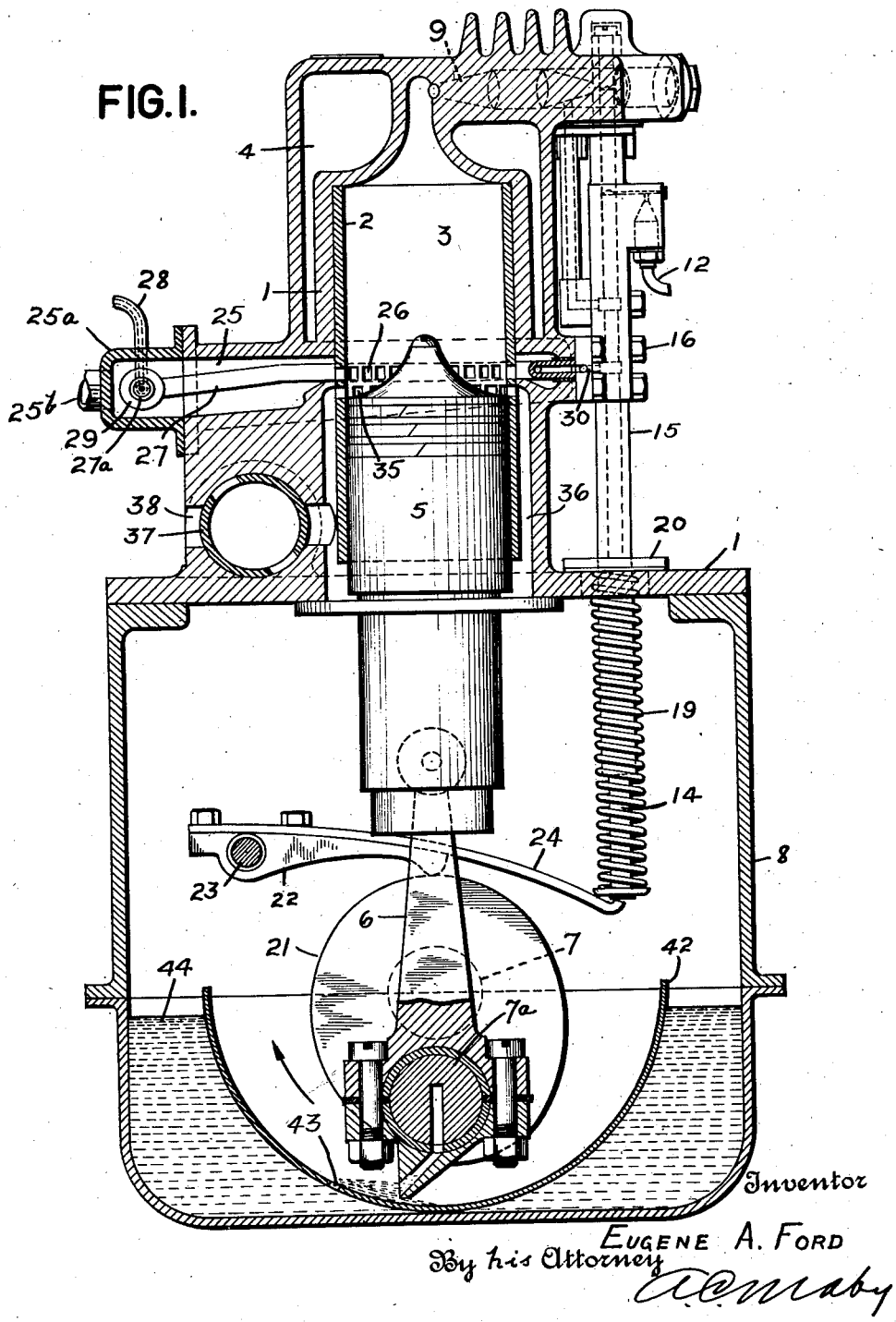

1,988,309

UNITED STATES PATENT OFFICE 1,988,309

FUEL INJECTION DEVICE FOR ENGINES

Eugene A. Ford, Scarsdale, N. Y.

Application January 8, 1930, Serial No. 419,306

4 Claims. (Cl. 123—33)

This invention relates to internal combustion engines of the type adapted to use liquid fuel oil such as crude oil, kerosene, gasoline, etc., and in which the fuel is ignited by the heat developed by compression of air in the combustion space of the motor.

One of the objects of the invention is to provide a simple and effective means for injecting the fuel into the combustion chamber at the point of highest compression of the air therein.

Another object is to devise a method and means whereby steam may be introduced into the injector chamber to mix with the fuel so as to partially vaporize the fuel before it is injected and to then be injected simultaneously with the fuel into the compressed air in the combustion chamber at high velocity, causing complete vaporization of the fuel and thorough mixing with the air in the combustion chamber without any precombustion in the injector chamber.

Another object is to utilize the heat from the exhaust to convert water into the steam used for this purpose and also to use some of the steam in the expansion chamber, thereby converting into power some of the heat that would otherwise be wasted and to thus increase the efficiency of the engine.

Another object is to provide a secondary combustion chamber of such dimensions and shape that the fuel oil may be sprayed throughout the whole volume of the air charge compressed therein so as to attain the maximum volumetric efficiency.

Another object is to so introduce the steam into the combustion chamber as to maintain a constant pressure on the piston for a greater portion of its power stroke than would be maintained by the explosive force alone.

Another object is to use the steam to force the products of the combustion from the combustion chamber.

Another object is to provide an injector piston and steam valve made of a single rod and to so time its operation with respect to the movement of the engine piston as to properly function for the injection of the fuel as well as the admission and shutting off of the steam.

Other objects will appear in the description of the invention which follows.

Referring to the drawings wherein I have shown what I now consider to be the preferred form of my invention:

Fig. 1 is a sectional elevation through one of the cylinders of an engine embodying my invention.

Fig. 2 is a sectional detail of the fuel injecting device.

Fig. 3 is a continuation of the lower part of the injector shown in Fig. 2.

Fig. 4 is a further detail illustrating the operation of the injector.

Fig. 5 is a sectional detail taken on line 5—5 of Fig. 4, showing a perforated plate through which the fuel is injected into the combustion chamber.

In the drawings the cylinder casing 1 is provided with an inner lining 2 to form the expansion or combustion chamber 3. A cooling fluid chamber 4 may be provided without the cylinder. The piston 5 is connected by the connecting rod 6 at 7a to the crank shaft 7 within the crank case 8. The cylinder casing is mounted on the crank case as shown. A secondary combustion chamber 9 communicates with the main combustion or expansion chamber 3. The upper portion of the chamber 3 is of greatly reduced area and the top of the piston is so shaped as to substantially fill the space so as to effect greater compression of the air taken in and to force the greater part of such compressed air into the chamber 9.

The chamber 9 connects with the injector chamber 10 through several small holes 11. A fuel feed pipe 12 communicates with a passage 13 which leads into the injector chamber. A rod 14 constitutes the piston for forcing the fuel into the combustion chamber. The casing 15 which forms the injection chamber and contains the injection piston is fastened to the engine casing 1 by bolts 16 and reaches down into the crank case 8. The rod 14 projects below the casing 15 and has a flange 17 at its lower end. A member 18 resting on the flange forms a seat for a spring 19 pressing at its upper end against a member 20 fastened to the casing 1. The spring serves to lower the rod 14 to the position of Fig. 2. A cam 21 fixed on shaft 7 cooperates with a follower arm 22 pivoted at 23. A strong resilient leaf 24 fastened to the arm 22 engages the lower end of the rod. The cam 21 thus acts to raise the rod 14 against the action of spring 19 to the position of Fig. 4.

The cylinder casing 1 is so designed as to form an exhaust cavity or space 25 surrounding the cylinder chamber 3 and the lining wall 2 is provided with circumferentially disposed holes 26 to permit the hot gases from the combustion chamber to escape into the space at the end of the working stroke of the piston. A channel member 25a attached to the casing 1 connects the space 25 of the several cylinders and is provided with an opening 25b through which the gases may escape. A tubing 27 in the space 25 is connected to a boiler tube 27a in the channel member 25a and a pipe 28 is adapted to supply water to the boiler. Heat radiating or absorbing fins 29 on the boiler tube will help to quickly heat the water to create steam. The other end of tube 27 connects at 30 with an opening 31 into the injection chamber casing 15. A passage 32, also communicating with the interior of casing 15, leads to the secondary combustion chamber 9. The injection plunger rod 14 has a reduced diameter at 33 which registers with the openings 31 and 32 when the plunger is at the end of its up stroke as in Fig. 4. This permits steam from the tube 27 to enter the chamber 9. Near the end of the down stroke of the piston 5, the ports 26 are uncovered and the hot exhaust gases escape into the space 25, 25a. Immediately following this, the lower holes 35 become uncovered by the piston and air compressed in the space 36 enters with great force through ports 35 into the combustion chamber. The curved conical shape of the piston causes the air to pass upwardly through the middle of the chamber. It then spreads and passes downwardly, forcing the combustion gases out through exhaust ports 26. A rotary valve member 37, connected by gearing which need not be shown here, to the shaft 7 is timed to open the passage 38 to permit air to be drawn into the space 36 as the piston rises. On the down stroke of the piston the valve is closed and the air is compressed. Immediately after the ports 35 are opened and the compressed air enters, the piston starts up. As soon as the piston closes the ports 35 and 26 it begins to compress the air which is now in the combustion chamber. The chamber 9 and the upper end of chamber 3 will still contain steam which continued to enter during a considerable portion of the expansion stroke. This steam will then be forced back and some of it will be forced through the small holes into the fuel injection chamber 10.

The cam 21 is so designed that the plunger 14 does not begin to rise until the piston 5 has risen a considerable distance. The plunger commences to rise and rises slowly at first and increasing its speed as the piston nears the upper end of its stroke. During the last small fraction of the compression stroke of the piston the plunger 14 rises very rapidly, forcing the steam from the chamber 10 back into the chamber 9. The steam carries with it the fuel which was forced into the chamber 10 through passage 13 and spreads it in a spray throughout the chamber 9. The intense heat of the compressed air ignites the fuel and the expansion stroke commences. During this moment the steam valve is open and the steam is free to enter the combustion chamber although it may be held back by the great pressure of the combustion gases at the commencement of combustion. But as the piston is forced down and the pressure lessens, the steam will enter and add its force to the gases and thus maintain the high pressure for a greater portion of the stroke. The cam 21 is so designed that during a considerable portion of the down stroke of the piston 5 the plunger 14 will remain in the position of Fig. 4 and the steam will continue to press into the top of the cylinder. This will force practically all of the combustion gases out of the chamber 9. As the cylinder continues to descend, the cam 21 will permit the plunger 14 to commence to move down. The steam is then shut off and as the plunger 14 descends it draws steam from the chamber 9 into the injection chamber 10 to mix with the next charge of fuel.

As shown in Fig. 3, the lower end of the plunger 14 fills the casing 15. Above this there is a space 40 where the plunger is of smaller diameter. Near the top of this space are several holes 41 communicating with the inside of the crank case 8. Within the crank case the splashing of the oil causes an oil vapor to fill the space. As the plunger 14 descends and tends to create a vacuum in the space 40 the oil vapor is drawn into this space. As the plunger then rises some of this oil serves to lubricate the plunger and casing 15.

Within the crank case 8 is a curved plate 42 attached at its ends to the walls of the crank case. One or more perforations 43 may be provided to permit the oil 44 to flow into the compartment formed by the plate 42. When the engine is idle the oil is at the same level in the two compartments, but when operating, the oil is thrown into the outer compartment. It will flow slowly through the perforations to the inner compartment where it will be scooped for lubricating. This creates the vapor in the crank case.

By making the portion 24 of the cam follower arm resilient, the plunger 14 may be adjusted to rise to the very top of its cavity 10, and when expansion of the plunger takes place due to heat, any variation of this adjustment will be met by the yielding of the arm 24. Also, if the plunger tends to be sluggish at any time in its movement upward, the arm may yield.

While I have disclosed the fundamental features as applied to one form of my invention it will be understood that various omissions and substitutions and changes in the form of the device disclosed and in its operation may be made by those skilled in the art without departing from the spirit of the invention. It is the intention, therefore, to be limited only as indicated by the scope of the following claims:

Having described my invention, what I claim and desire to secure by Letters Patent is:

1. In combination with an internal combustion engine having a combustion cylinder, a steam generator associated with said cylinder and adapted to be heated by the exhaust therefrom, a connection for carrying steam from the generator to the combustion end of the cylinder, and a pump including a plunger for forcing fuel into the cylinder, and also including a valve portion for controlling the admission of steam to the cylinder.

2. In an internal combustion engine, a cylinder, an inlet for admitting steam to the cylinder, a separate inlet for admitting fuel to the cylinder and adapted to direct the fuel across the path of the incoming steam, and a plunger for forcing the fuel into the cylinder and also including a valve portion for controlling the admission of steam to the cylinder.

3. In an internal combustion engine, a cylinder having a piston therein, a combustion chamber adjoining said cylinder, a fuel injection chamber connected with the combustion chamber, means for supplying steam to the combustion chamber, means for causing steam to flow from the combustion chamber into the fuel injection chamber, and for forcing such steam from the injection chamber back into the combustion chamber along with fuel from the injection chamber.

4. In an internal combustion engine having an expansion cylinder and a piston therein, a fuel injection chamber connected with the expansion cylinder, means for carrying steam into the expansion cylinder, the compression stroke of the piston acting to force part of the steam into the fuel injection chamber, and means for forcing such steam back from the injection chamber into the expansion cylinder along with fuel.

EUGENE A. FORD.